Figure 1:
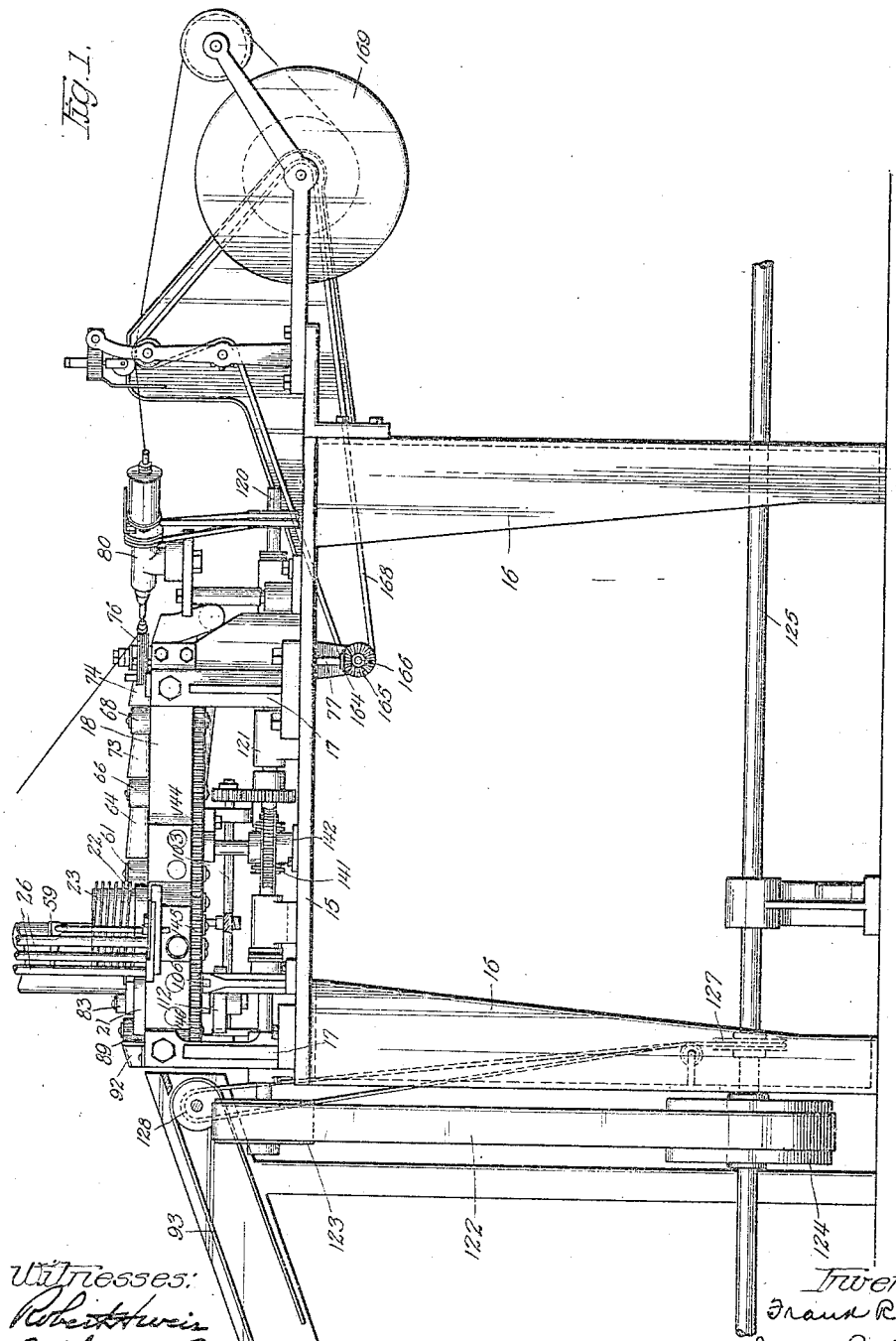

F. R. HOLDRED.
MACHINE FOR TREATING QUILLS.
APPLICATION FILED SEPT. 19, 1917.

1,294,803.

Patented Feb. 18, 1919.
9 SHEETS—SHEET 3.

F. R. HOLDRED.
MACHINE FOR TREATING QUILLS.
APPLICATION FILED SEPT. 19, 1917.

1,294,803.

Patented Feb. 18, 1919.
9 SHEETS—SHEET 4.

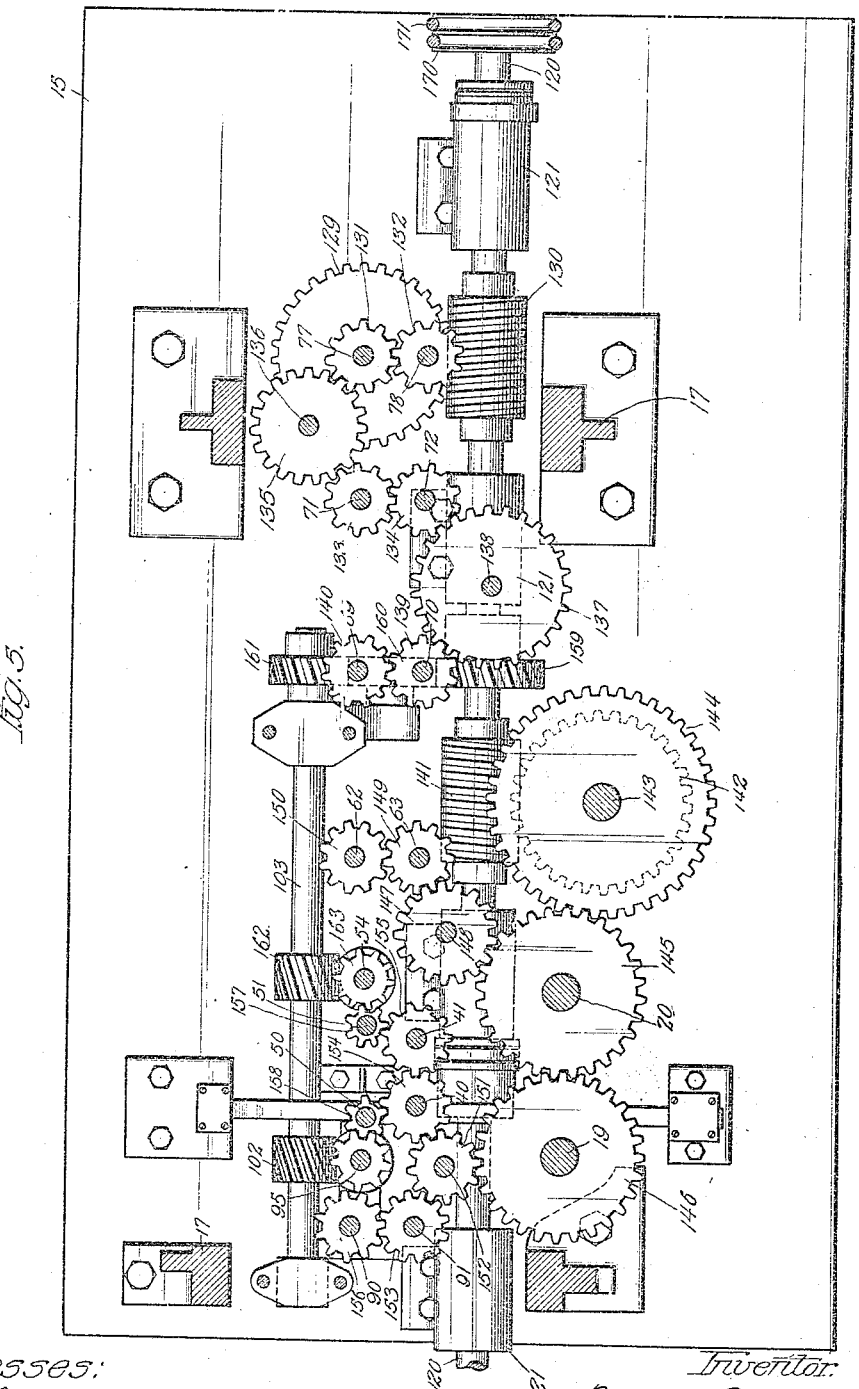

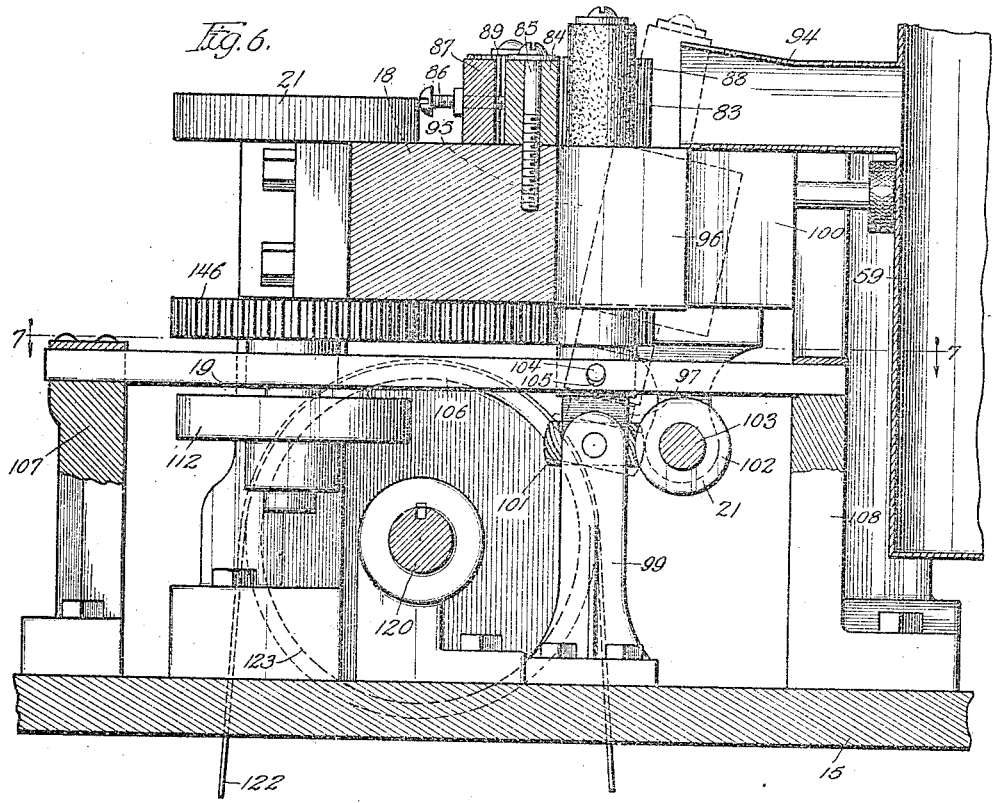
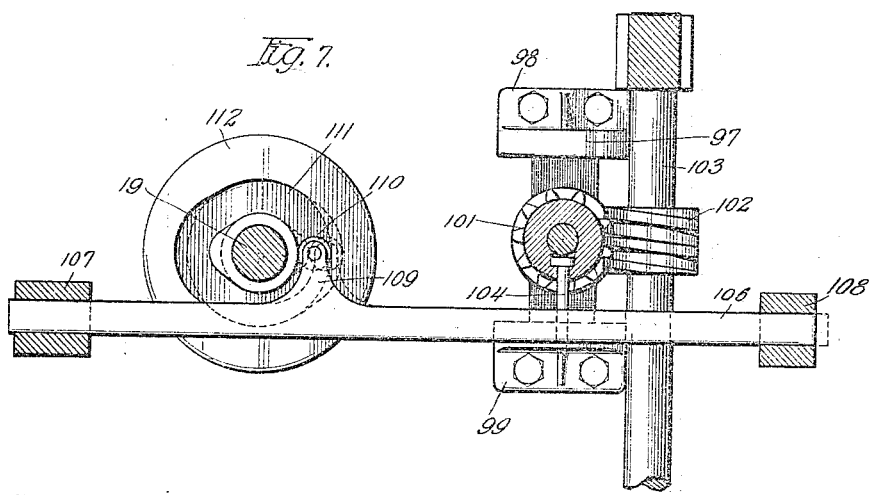

F. R. HOLDRED.
MACHINE FOR TREATING QUILLS.
APPLICATION FILED SEPT. 19, 1917.
1,294,803.
Patented Feb. 18, 1919.
9 SHEETS—SHEET 7.
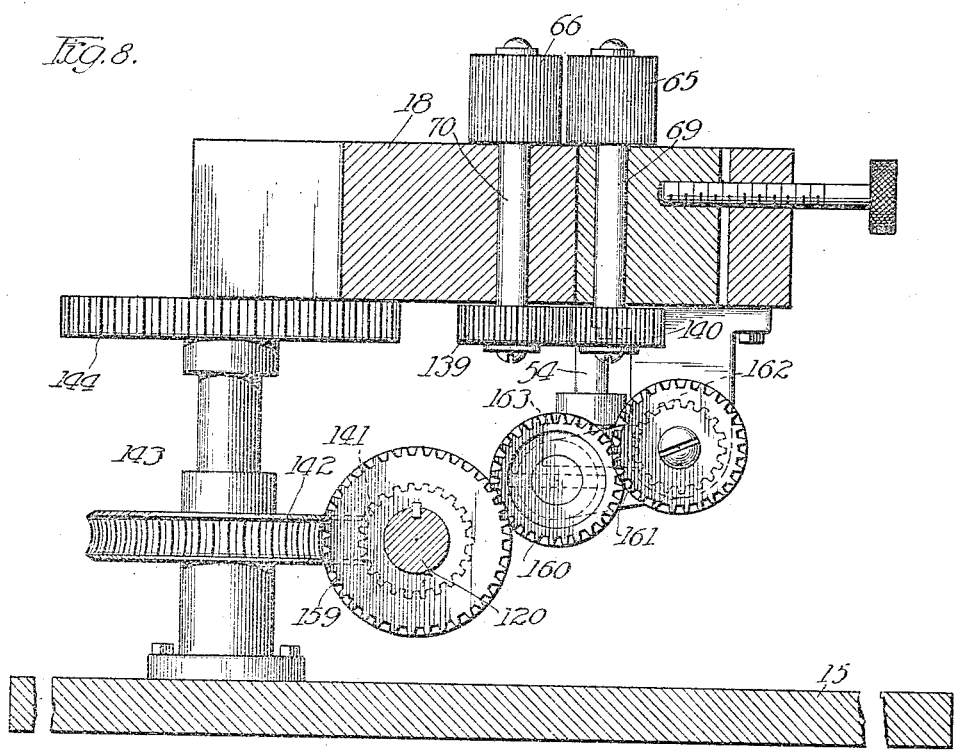
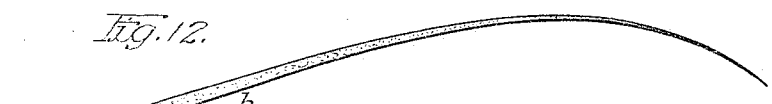
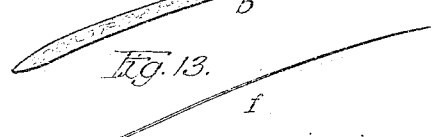
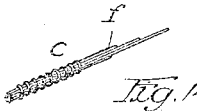

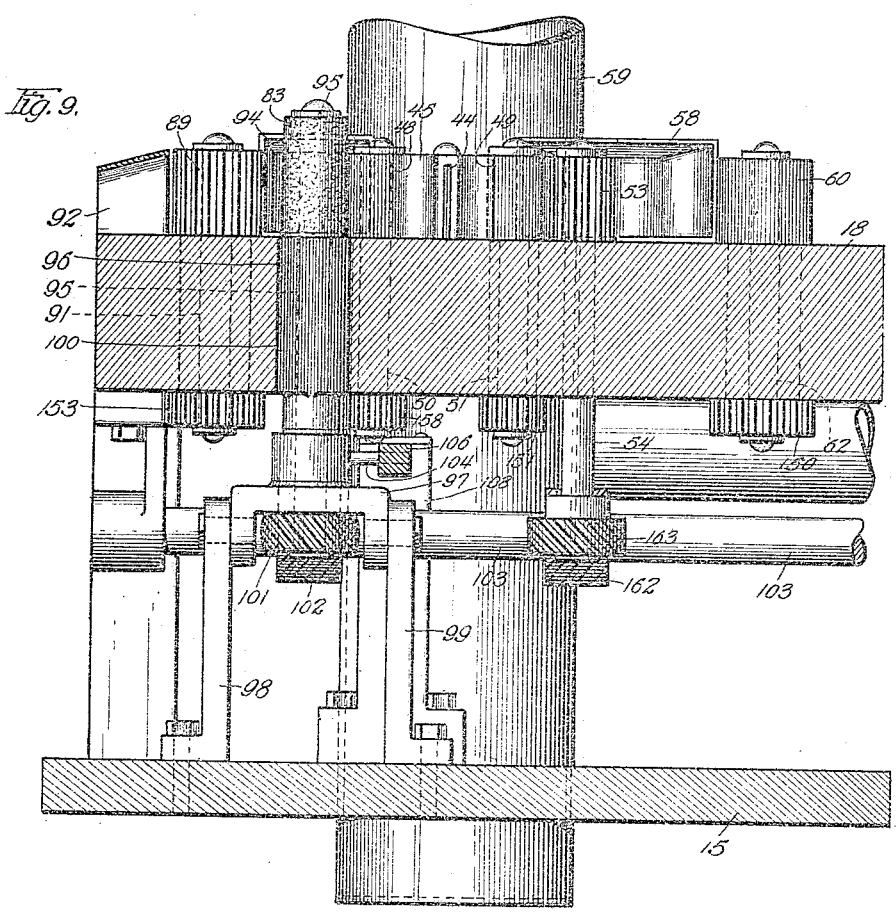

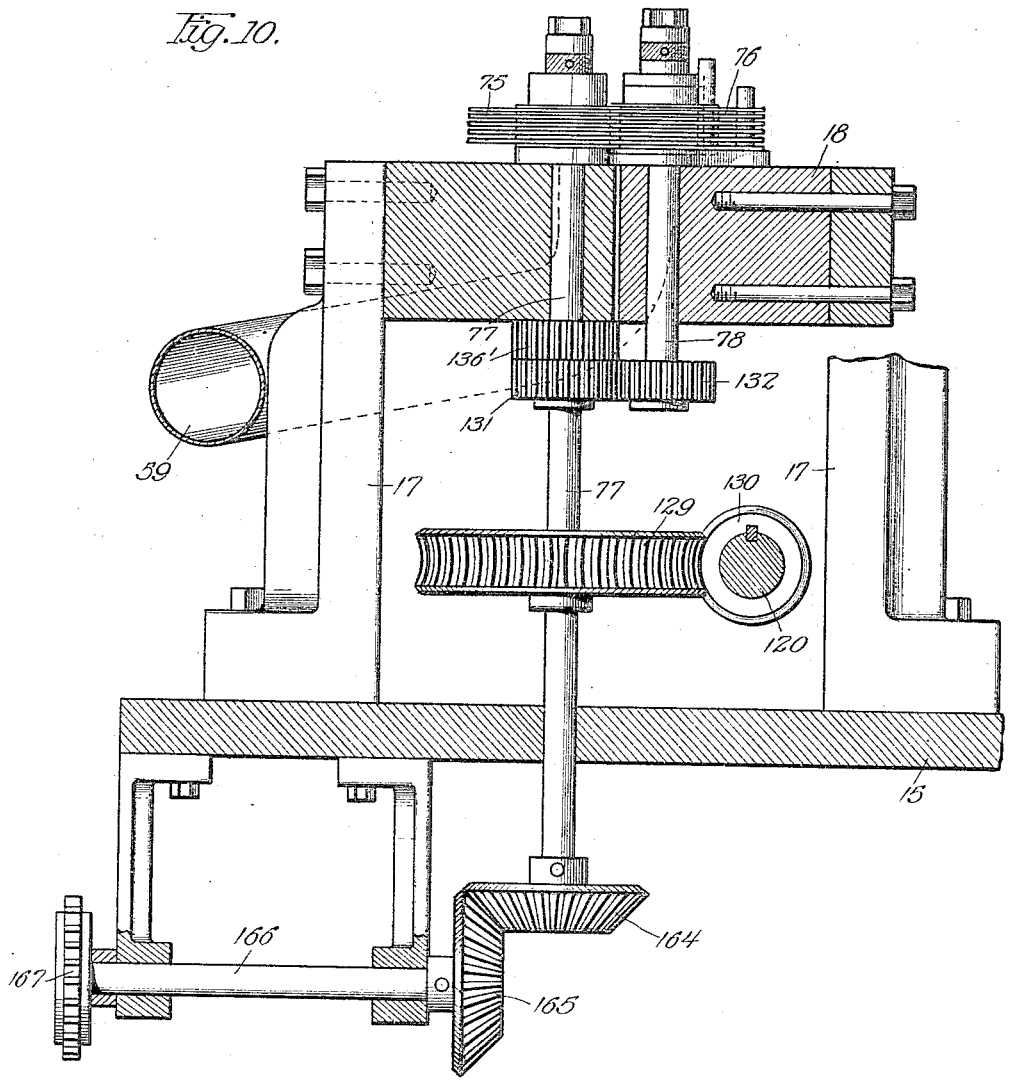

UNITED STATES PATENT OFFICE.

FRANK R. HOLDRED, OF THREE OAKS, MICHIGAN, ASSIGNOR TO THE WARREN FEATHERBONE COMPANY, OF THREE OAKS, MICHIGAN, A CORPORATION OF MICHIGAN.

MACHINE FOR TREATING QUILLS.

1,294,803.

Specification of Letters Patent.

Patented Feb. 18, 1919.

Application filed September 19, 1917. Serial No. 192,069.

*To all whom it may concern:*

Be it known that I, FRANK R. HOLDRED, a citizen of the United States, and a resident of Three Oaks, in the county of Berrien and State of Michigan, have invented certain new and useful Improvements in Machines for Treating Quills, of which the following is a specification.

My invention relates to an improved machine for treating quills to adapt one part thereof for the manufacture of devices such as feather dusters, and the other part for the manufacture of stiffening cord, tape, or bands for use in the manufacture or support of wearing apparel.

Machines have been devised for cutting the barbs from feathers and for splitting the debarbed quill lengthwise and then cutting the halves lengthwise into slivers or fibers which are bound together to form stiffening cord, tape, or bands. Quills are used extensively in the manufacture of feather dusters and in general the object of my invention is to produce a simple and efficient machine into which the raw quills or feathers are fed, which splits the quills lengthwise in such manner that the barbs will remain on the outer or crown portion of the quill, which thoroughly cleans the parts of pith and then transversely corrugates or crimps the barb part to make it pliable for use in feather dusters, and which slits the other part into slivers or fibers and binds such fibers together to form the stiffening cord, tape, band or other product.

One important feature of the invention resides in removing the pith from the barb quill part by means of an abrasive wheel which rotates to grind in the direction of the slant of the barbs of the quill part which travels past the wheel, base end first.

Another feature resides in the provision of corrugating or crimping rolls which serve to grasp the barb quill parts to draw them through the grinding field and to simultaneously transversely corrugate or crimp them to make them pliable for use in feather dusters. The raw feathers are fed into the machine against the edge of a knife which splits them longitudinally and then the feed rollers grasp the respective sections, the barb section being fed toward the grinding plane and the other section being guided toward the fibering apparatus.

Another feature of the invention resides in the withdrawing of the grinding wheel from its operative position against the barb quill section until such section has been grasped by the crimping rolls, thus preventing buckling and breaking of the section between the grinding wheel and the feed rollers, the grinding wheel traveling at a comparatively high rate of speed.

The above and other features of my invention are embodied in a machine disclosed on the accompanying drawings, in which—

Figure 2:
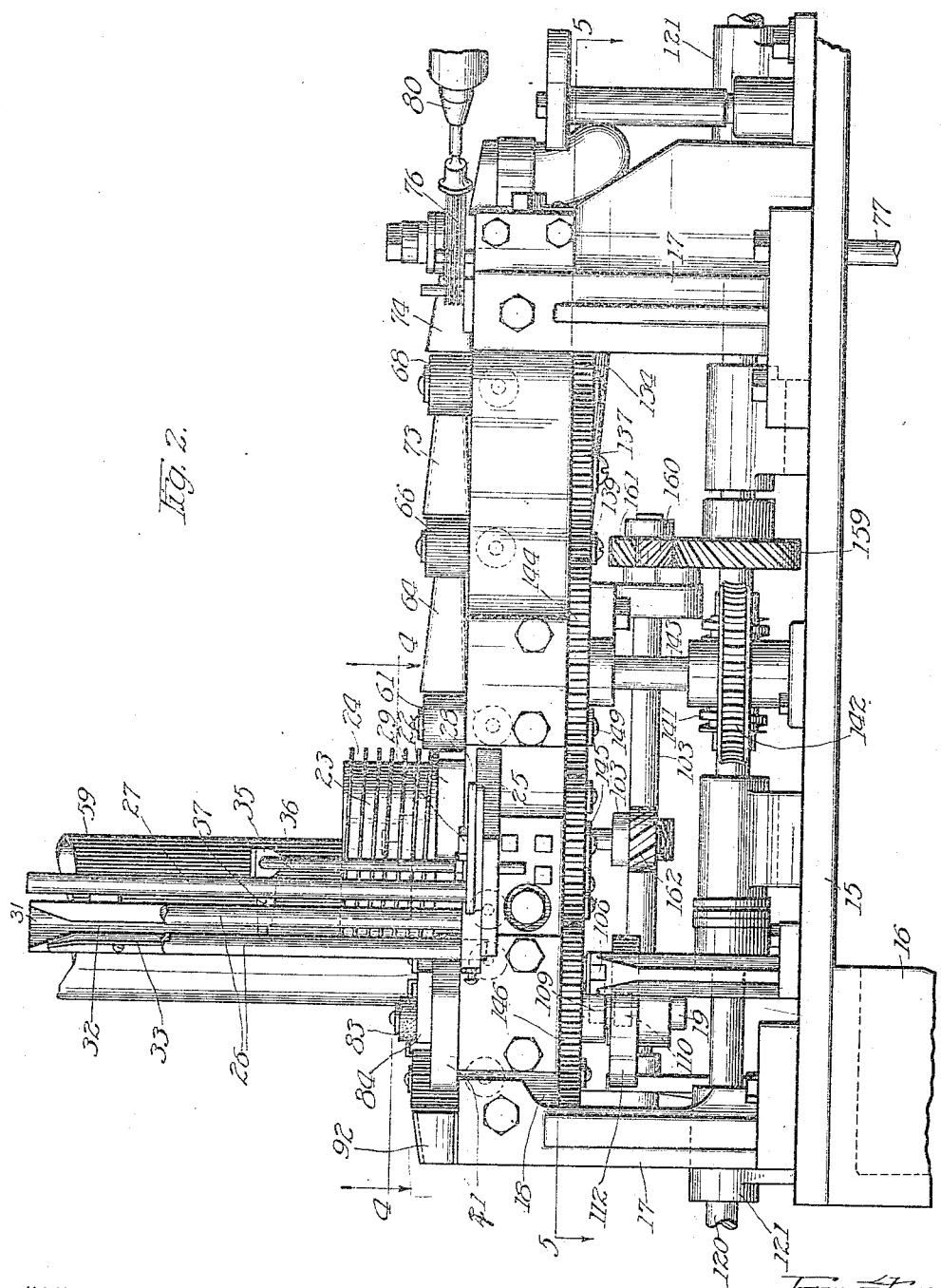
Figure 3:
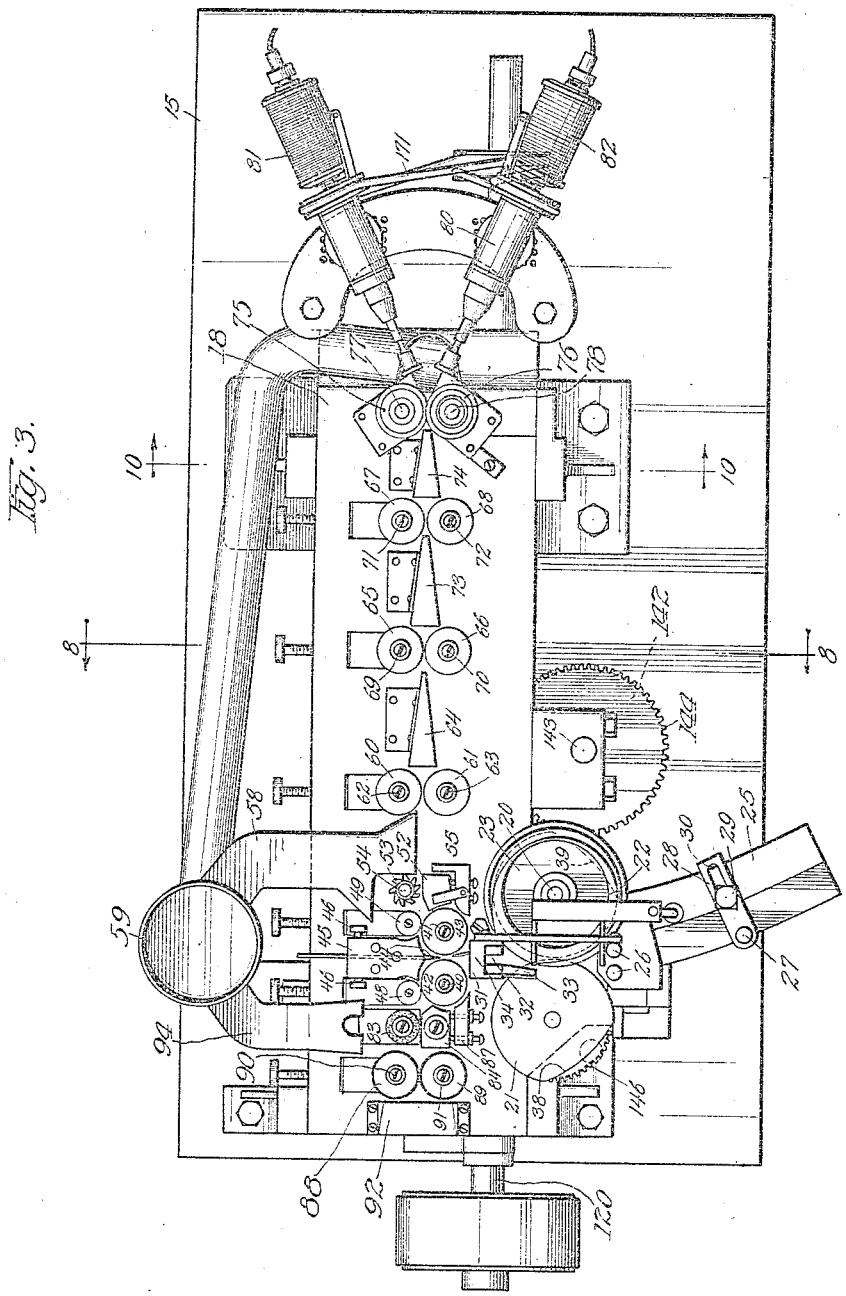
Figure 4:
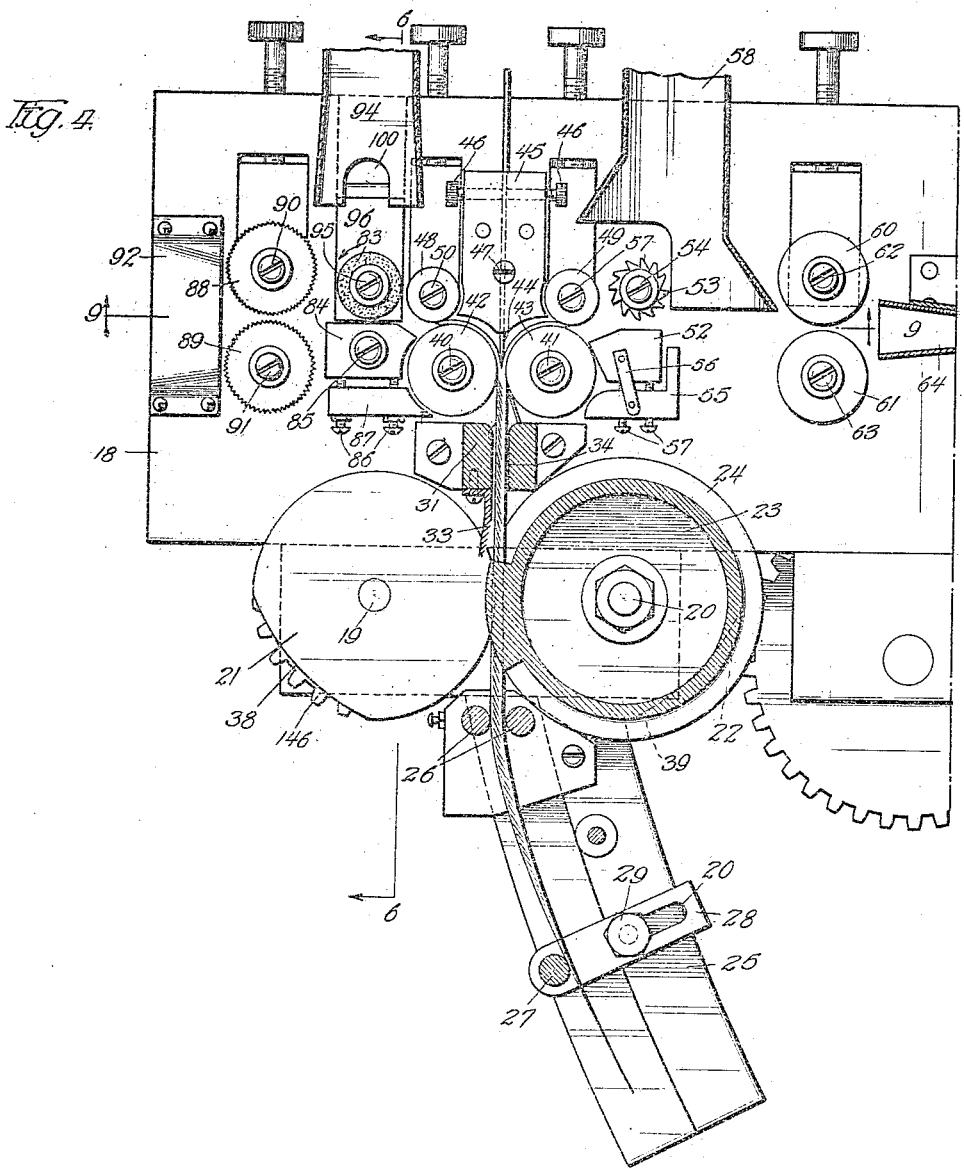

Figure 1 is a side elevational view of the machine,

Fig. 2 is an enlarged side elevational view of the top part of the machine showing the various operating and driving mechanisms, Fig. 3 is a plan view of the parts shown in Fig. 2, Fig. 4 is a sectional view taken on plane 4—4, Fig. 2, Fig. 5 is a sectional view on plane 5—5, Fig. 2, Fig. 6 is a sectional view on plane 6—6, Fig. 4, Fig. 7 is a sectional view on plane 7—7, Fig. 6, Fig. 8 is an enlarged sectional view on plane 8—8, Fig. 3, Fig. 9 is a sectional view on plane 9—9, Fig. 4, Fig. 10 is an enlarged sectional view on plane 10—10, Fig. 3, Fig. 11 shows one of the quill sections delivered by the machine ready for use in the manufacture of dusters, Fig. 12 shows one of the quill sections before cutting thereof into slivers or fibers, Fig. 13 shows one of the slivers or fibers, Fig. 14 shows a bundle of slivers or fibers bound together to form stiffening cord.

Referring to Fig. 1, the machine bed 15 is mounted on suitable legs 16, and on standards 17 secured to the bed 15 the table or top 18 is supported, the various quill treating parts being mounted on this table and the various driving trains and parts therefor being disposed between the table and the bed 15. Journaled in the bed and table of the machine are two vertical shafts 19 and 20 which above the table carry respectively the feed disks 21 and 22. Above the disk 22 the shaft 20 carries a feed drum 23 having a spiral feed groove 24 surrounding its periphery. In front of the feed disks is the base 25 from which rise the two vertical guide posts 26, the guide space between which is directly in front of the entrance between the feed disks 21 and 22. In front of these posts another guide post 27 rises from a plate 28 adjustably secured to the base 25 by the screw 29 engaging through the slot 30 in the plate. Behind the space between the feed disks 21 and 22 is the vertical guide hopper 31 having the guide slot 32 for receiving the base ends of the quills which are fed vertically thereinto with their outer portions between the guide posts 26 and to the right of the guide post 27, the hopper and guide posts being arranged to accommodate the natural curvature of the quills which are fed in with their barbs extending in a vertical plane. On the left side of the chute 31 a guide plate 33 is fastened to assist in guiding and retaining the quills within the hopper. The back of the hopper is closed except at its lower end where it has the passageway 34 through which the lowermost quill can pass. When the quills are fed into the machine they rest first on top of the spiral feed drum 23 and are then received in the spiral groove 24 and gradually lowered to the space between the feed disks and in front of the passageway 34 whereupon they are shifted rearwardly for treatment. A weight 35 is secured to the upper end of the vertically shiftable rod 36 and has the arms 37 projecting over the quill stack. After a stack of quills has been inserted into the hopper and between the guide posts the weight arms are applied to the top of the stack and the quills are then urged downwardly toward the spiral feed drum.

In order to cause the quills to be fed into the machine, one a distance behind the other, the feed disks 21 and 22 are cut away on one side to leave chord surfaces 38 and 39 respectively. When these chord surfaces are opposite each other the quill between them will not be advanced, but as soon as the cylindrical surfaces of the disks oppose each other the quill will be advanced and fed into the machine through the passageway 34.

Just behind the hopper 31 are the two vertical shafts 40 and 41 which above the table 18 carry the knurled feed rolls 42 and 43 which receive the quills one after the other as they emerge from the passageway 34 and propel them rearwardly. A knife blade 44 extends forwardly into the space between the rolls 42 and 43, the quills being drawn past this blade to be split longitudinally, the cut being just to the right of the barbs in order that the barbs will remain on the outer or crown side of the quill. The blade is adjustable in its supporting standard 45 by means of set screws 46 and 47. The front faces of the supporting frame 45 also serve as guides for the sections of the split quills and these sections are guided around the rolls 42 and 43 and between these rolls, and the respective companion rolls 48 and 49 mounted on shafts 50 and 51 respectively. The barb quill sections $a$ and the unbarbed or bony quill sections $b$ thus travel laterally in opposite directions after the splitting operation. The quill sections $b$ travel toward the right between a guide block 52 and a tooth cutter 53 on the shaft 54, the guide block 52 being supported from the bracket 55 by links 56 and is adjustable with reference to the cutter by means of set screws 57. As the quill sections $b$ travel between the guide block and the cutter their inner or pith side is exposed to the cutter which is rapidly rotated and removes the pith, the removed pith being drawn into the funnel 58 connected with a suction main 59. After being cleaned of pith the quill sections $b$ are received between the guide rolls 60 and 61 on shafts 62 and 63 and are fed by these rolls through a converging guide frame 64 mounted on the table 18. Two more sets of guide rolls 65, 66 and 67, 68 are shown, the rolls being mounted respectively on shafts 69 and 70, and 71 and 72, the convergent guide frames 73 and 74 receiving the quill sections from the respective roll sets. From the frame 74 they are fed between cutter drums 75 and 76 on shafts 77 and 78 by which they are cut into slivers or fibers $f$ (Fig. 13) which enter the wrapping devices 79 and 80 to be securely bound together by a cord from the spools 81 and 82 and to emerge as cord $c$, such as shown in Fig. 14. As the wrapping or binding mechanism does not form part of my present invention it is not necessary to go into details here, such binding mechanism being shown and described in Patent No. 836,420 of November 20, 1906.

The barbed quill sections $a$ after passing between the rolls 42 and 48 pass through the grinding field between the abrasive or grinding wheel 83 and the guide block 84, this guide block being pivoted on a stud 85 and rotatably adjustable by means of set screws 86 extending through the bracket 87. The quill sections $a$ pass through the grinding field with their pith sides exposed to the grinding wheel and are then received between the corrugating or crimping rolls 88 and 89 on vertical shafts 90 and 91. This crimping is transverse of the quills and makes them soft and pliable, the finished quills being delivered through the guide frame 92 to a conveyer belt 93 (Fig. 1.) The pith removed by the grinding wheel is drawn into the chute 94 connecting with the suction main 59. The grinding wheel is rapidly rotated to grind the pith in the direction opposite to that from which the quill is traveling, the grinding being then more in the direction of the slant of the barbs and away from the barb bases, this preventing breaking or injuring the barbs. As the quill sections *a* are quite flexible, the rapidly rotating wheel grinding toward the direction of approach of the quill sections will tend to back up the quill sections or buckle them unless the outer ends of the quill sections are held. As the quill sections are not held at their outer ends until they reach the crimping rolls 88 and 89 I provide means for automatically withdrawing the grinding wheel from the grinding field until a quill section has been received at its end between the crimping rolls. Then when the grinding wheel is brought back into grinding position the quill section will be forcibly drawn through the grinding field in engagement with grinding wheel and buckling or breaking of the quill section between the grinding field and feed rolls is prevented. Referring to Figs. 2, 4, 6, 7 and 9, the grinding wheel shaft 95 is journaled in a frame 96 which rises from the yoke frame 97 pivoted between the standards 98 and 99 rising from the bed 15, the frame 96 being guided in the slot 100 provided in the table 18. Within the yoke frame 97 and secured to the lower end of the grinding wheel shaft is the worm wheel 101 which meshes with the worm 102 on the shaft 103. In order that the frame 96 and yoke 97 may swing to carry the grinding wheel away from the grinding field, the worm wheel 101 is transversely rounded to the proper radius so that it will always mesh properly with the worm 102.

From the frame 96 a pin 104 extends laterally into the slot 105 in the cross bar 106 which is slidable in the tops of standards 107 and 108 rising from the machine bed 15. This rod has an arm 109 to whose end a cam roller 110 is pivoted, this roller extending into the cam groove 111 in the cam disk 112 secured to the lower end of shaft 19 which at its upper end supports the feed disk 21. The cam groove is designed to effect shifting of the rod 106 at the proper time against the pin 104 to cause rearward swing of the grinding wheel shaft bearing frames and removal of the grinding wheel from the grinding field, the wheel being brought back into the field each time a quill section *a* is received by the crimping rolls 88 and 89 and removed from the field before the next quill section reaches such field.

Describing now the various driving trains for the various operating parts, the main shaft 120 is journaled in suitable bearings 121 on the machine bed 15 and is driven by a belt 122 engaging the belt pulley 123 and the belt pulley 124 on the power shaft 125. A belt 126 connects the pulley 127 on the power shaft with the pulley 128 on the shaft of the conveyer belt 93. On the shaft 77 which supports the cutter 75 the worm wheel 129 is secured which meshes with the worm 130 on the drive shaft 120, and the pinion 131 on shaft 77 meshes with the pinion 132 on the shaft 78 which supports the companion cutter 76. On the shafts 71 and 72 for the guide rollers 67 and 68 are the intermeshing gear pinions 133 and 134, the pinion 134 being driven by the idler gear 135 which is mounted on shaft 136 and which meshes with the pinion 136′ (Fig. 10). The idler gear 137 on shaft 138 transmits rotation from the pinion 134 to pinion 139 on shaft 70 and this pinion meshes with the pinion 140 on shaft 69.

The worm 141 on the drive shaft meshes with the worm wheel 142 on shaft 143 and the gear 144 on this shaft meshes with the gear 145 on the shaft 20 which supports the feed disk 22 and the spiral feed drum 23. The gear 145 meshes with the gear 146 on the shaft 19 which carries the feed disk 21. The gear 145 meshes with the idler 147 on shaft 148 which idler meshes with the pinion 149 on shaft 63, and this pinion meshes with the pinion 150 of shaft 62, the guide rolls 60 and 61 being thus driven. The gear 146 meshes with the pinion 151 on shaft 152 and this pinion meshes with the pinions 153 and 154 on the shafts 91 and 40 respectively, pinion 154 meshing with the pinion 155 on shaft 41 and pinion 153 meshing with pinion 156 on shaft 90. The feed rolls 42 and 43 and the crimping rolls 88 and 89 are thus driven. The shafts 50 and 51 for the feed rolls 48 and 49 which coöperate with the feed rolls 42 and 43 are driven by means of pinions 157 and 158 on the respective shafts and meshing respectively with the gears 155 and 154 on the shafts 40 and 41. The gear 159 on the drive shaft 120 meshes with an intermediate gear 160 which in turn meshes with the gear 161 on the shaft 103 on which is secured the worm 102 which meshes with the worm wheel at the lower end of the driving wheel shaft. This shaft 103 carries also the worm 162 which meshes with the worm wheel 163 on the shaft 54 which supports the cutter 63.

Shaft 77 which supports the fiber cutting drum 75 has secured to its lower end a bevel gear 164 which meshes with the bevel gear 165 on the short shaft 166 whose rear end carries sprocket wheel 167 around which a chain 168 travels, this chain driving the intake reels 169 for receiving the finished stiffening cord *c*. At the end of the drive shaft 120 is a pulley 170 about which passes the belt 171 which is associated with the wrapping devices 81 and 82 to effect rotation thereof.

The operation of the machine has substantially been indicated during description of the various parts but to briefly recapitulate, the raw feathers are fed into the hopper between the guides with their barbs in a vertical plane and then the spiral drum 23 will bring the feathers successively into position between the feed disks 21 and 22 which disks will propel the feathers or quills one after the other into the machine through the passageway 34 and at intervals corresponding to the length of the cut away portions 38 and 39 of the feed disks. The quills are drawn past the splitting knife by the feed rolls 42 and 43, the quill sections $a$ with the barbs thereon passing to the left and the other sections $b$ passing to the right. The sections $b$ are cleaned of pith by the cutter 53 and are guided through the various guide rollers and guide frames to be cut up into fibers or slivers and bound to form cord or other stock. The barb sections $a$ are fed to the crimping rolls 88 and 89 and immediately upon reception by such rolls the grinding wheel is brought against the sections to clean the pith therefrom, the grinding being in the direction to prevent injury to the barbs. The cleaned and crimped sections $a$ are then delivered from the machine to be utilized in the manufacture of feather dusters or other devices.

It is evident that modifications and changes may be made in the construction and arrangement and relative disposition of the various parts without departing from the scope of the invention and I do not therefore desire to be limited to the exact construction, arrangement and operation shown and described.

I claim as follows:

1. In a quill treating machine, the combination of feed rollers, means for feeding quills one at a time to said feed rollers, a knife blade past which said quills are drawn by said feed rollers to be split longitudinally along one side the barbs whereby the barbs are retained on only one of the quill sections, crimping rolls for receiving the barbed quill sections from the feed rolls, a grinding wheel between said feed rolls and crimping rolls for removing the pith from the quill sections, means for automatically holding said grinding wheel away from the quill sections until such sections are received by the crimping rolls to be propelled thereby and for then bringing the grinding wheel into operative engagement with said sections, said crimping rolls effecting transverse crimping or creasing of the barbed sections to make them pliable.

2. In a quill treating machine, the combination of feed rolls for propelling split quill sections, receiving rolls for receiving the quill sections from the feed rolls and continuing the propulsion thereof, a grinding wheel between said feed rolls and receiving rolls, and means for automatically withdrawing said grinding wheel from the path of said sections before said sections have reached the receiving rolls and for bringing the wheel into operative engagement with the sections after they have been received by the receiving rolls, said wheel grinding in the direction of said feed rolls.

3. In a quill treating machine, the combination of feed rolls for propelling split quill sections, receiving rolls for receiving the quill sections from the feed rolls and continuing the propulsion thereof, a grinding wheel between said feed rolls and receiving rolls, a pivoted frame supporting said grinding wheel, means for automatically swinging said frame to hold the grinding wheel out of the path of said sections until said sections are gripped by the receiving wheels and for swinging said frame to bring the wheel into operative association with the sections as soon as they have been gripped by the receiving wheels, said wheel grinding in the direction of said feed rolls.

4. In a quill treating machine, the combination of quill receiving and propulsion rolls, means for splitting said quills longitudinally during passage through said propulsion rolls, a second set of rolls for receiving quill sections from said first mentioned rolls, a pith removing wheel rotatable opposite to the direction of travel of said sections to remove pith therefrom, and means for automatically withdrawing said wheel from said sections until they are gripped by said second rolls, and for shifting the wheel into operative engagement with the sections after they have been gripped by said second rolls.

5. In a quill treating machine, the combination of propulsion rolls for propelling quills one after the other, cutting means arranged in the path of said quills to split them longitudinally, receiving rolls for receiving the quill sections and continuing the propulsion thereof, a pith removing wheel between said propulsion and receiving rolls and rotatable in the direction from which said quill sections approach, a shaft on which said wheel is secured, a frame in which said shaft is journaled, a gear at the lower end of said shaft, a driving shaft supporting a companion gear, said frame being pivoted at its lower end, and means for swinging said frame to remove said wheel from the path of said quill sections until said quill sections have been gripped by said receiving rolls and to return said frame to bring the wheel into operative engagement with said sections after they have been gripped by said receiving rolls.

6. In a quill treating machine, the combination of propulsion rolls for propelling quills one after the other, cutting means arranged in the path of said quills to split them longitudinally, receiving rolls for receiving the quill sections and continuing the propulsion thereof, a pith removing wheel between said propulsion and receiving rolls and rotatable in the direction from which said quill sections approach, a shaft on which said wheel is secured, a frame in which said shaft is journaled, a gear at the lower end of said shaft, a driving shaft supporting a companion gear, said frame being pivoted at its lower end, and means for swinging said frame to remove said wheel from the path of said quill sections until said quill sections have been gripped by said receiving rolls and to return said frame to bring the wheel into operative engagement with said sections after they have been gripped by said receiving rolls, said gears remaining in mesh during swing of said frame.

7. In a quill treating machine, the combination of quill splitting means, propulsion rollers for propelling the resulting quill sections, receiving rolls for receiving the propelled sections to continue the propulsion thereof, a grinding wheel in advance of said receiving rolls for removing the pith from the quill sections, and means for bringing the grinding wheel into engagement with said quill sections only after they have been gripped by the receiving rolls.

8. In a quill treating machine, the combination of quill splitting means, propulsion rollers for propelling the resulting quill sections, receiving rolls for receiving the propelled sections to continue the propulsion thereof, a grinding wheel in advance of said receiving rolls for removing the pith from the quill sections, and means for bringing the grinding wheel into engagement with said quill sections only after they have been gripped by the receiving rolls, said grinding wheel being rotated to act on the sections in a direction opposite to that in which the sections are propelled.

In witness whereof, I hereunto subscribe my name this 10th day of Sept., A. D., 1917.

FRANK R. HOLDRED.

Copies of this patent may be obtained for five cents each, by addressing the "Commissioner of Patents, Washington, D. C."